(12) United States Patent
Porath

(10) Patent No.: US 6,878,867 B2
(45) Date of Patent: Apr. 12, 2005

(54) FREEZE-PROOF GAME CALL APPARATUS FOR CALLING PREDATORY GAME ANIMALS THROUGH INHALING

(76) Inventor: Jeff Porath, 5353 Milan Oakville Rd., Milan, MI (US) 48160

( * ) Notice: Subject to any disclaimer, the term of this patent is extended or adjusted under 35 U.S.C. 154(b) by 7 days.

(21) Appl. No.: 10/628,177

(22) Filed: Jul. 28, 2003

(65) Prior Publication Data

US 2005/0022651 A1 Feb. 3, 2005

(51) Int. Cl.[7] ............................................. G10D 13/08
(52) U.S. Cl. ........................ 84/402; 446/202; 446/207; 446/208; 446/209
(58) Field of Search ........................... 84/402; 446/202, 446/207, 208, 209

(56) References Cited

U.S. PATENT DOCUMENTS

| | | | |
|---|---|---|---|
| 2,961,135 A | 11/1960 | Hughes, Jr. .................. 224/28 |
| 3,802,120 A | * 4/1974 | Erhart .......................... 446/77 |
| 3,866,592 A | 2/1975 | Carella ..................... 124/24 R |
| 4,050,186 A | 9/1977 | Shults et al. .................. 46/180 |
| 4,280,299 A | 7/1981 | Oka ............................. 46/179 |
| 4,586,482 A | 5/1986 | Di Pietro ..................... 124/62 |
| 4,612,001 A | 9/1986 | Burnham .................... 446/208 |
| 4,656,746 A | 4/1987 | Gillespie ..................... 33/265 |
| 4,733,808 A | 3/1988 | Turner, Jr. et al. .......... 224/219 |
| 4,852,287 A | 8/1989 | Martin .......................... 42/90 |
| 4,862,625 A | 9/1989 | Dolan ............................ 43/1 |
| 4,888,903 A | 12/1989 | Knight et al. ................... 43/1 |
| 4,915,660 A | 4/1990 | Overholt, Sr. .............. 446/207 |
| 5,035,390 A | 7/1991 | Sanders ...................... 248/231 |
| 5,111,981 A | 5/1992 | Allen .......................... 224/202 |
| 5,211,596 A | 5/1993 | Bradshaw .................... 446/202 |
| 5,244,430 A | 9/1993 | Legursky ..................... 446/397 |
| 5,431,590 A | 7/1995 | Abbas ......................... 446/207 |
| 5,445,551 A | 8/1995 | Ady ............................ 446/209 |
| 5,577,946 A | 11/1996 | Oathout ....................... 446/208 |
| 5,664,360 A | 9/1997 | Conway ........................ 42/90 |
| 5,820,000 A | 10/1998 | Timberlake et al. ......... 224/219 |
| 5,885,125 A | 3/1999 | Primos ........................ 446/207 |
| 5,910,039 A | * 6/1999 | Primos et al. .............. 446/207 |
| 5,964,054 A | 10/1999 | Galfidi, Jr. ..................... 42/90 |
| 5,988,469 A | 11/1999 | Musacchia .................. 224/267 |
| 6,095,884 A | * 8/2000 | Wiley ......................... 446/208 |
| 6,120,341 A | 9/2000 | Hafford ....................... 446/208 |
| 6,514,116 B2 | 2/2003 | Abbas ......................... 446/202 |

FOREIGN PATENT DOCUMENTS

DE 666306 10/1938 ................... 77/17

* cited by examiner

*Primary Examiner*—Shih-Yung Hsieh
(74) *Attorney, Agent, or Firm*—Howard & Howard

(57) ABSTRACT

A freeze-proof, game call for calling predatory game animals through inhaling includes a mouthpiece, a reed assembly, and an amplification member. The mouthpiece has first and second ends with the first end defining an aperture for fluidly communicating with a mouth of a user such that the user can inhale through the aperture. The reed assembly is disposed within the mouthpiece at the second end and includes a reed. The reed has a working end opposite the aperture of the mouthpiece that vibrates as air is drawn across it to produce a tone upon inhalation by the user through the aperture. The reed assembly is free of grooves and O-rings that modify the tone produced by the reed assembly. The amplification member is operatively connected to the mouthpiece member to completely enclose the working end of the reed. The amplification member amplifies the tone produce by the reed assembly.

16 Claims, 3 Drawing Sheets

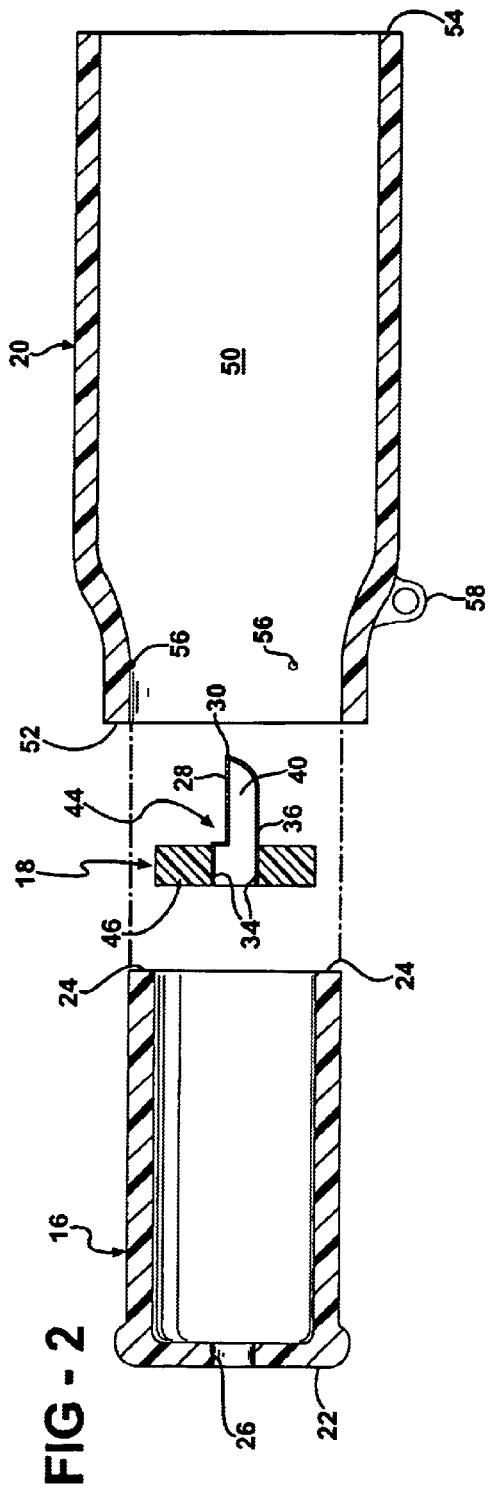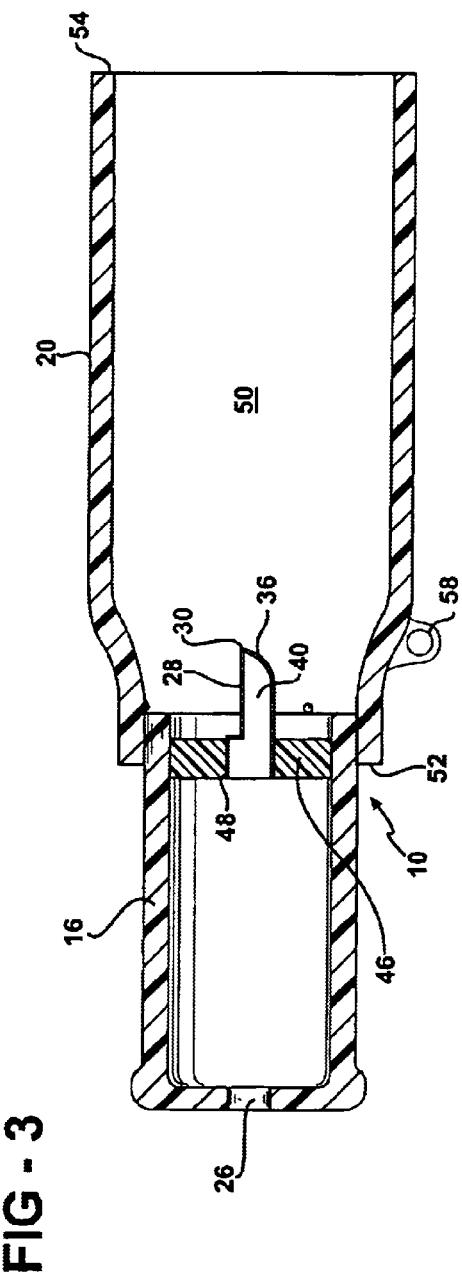

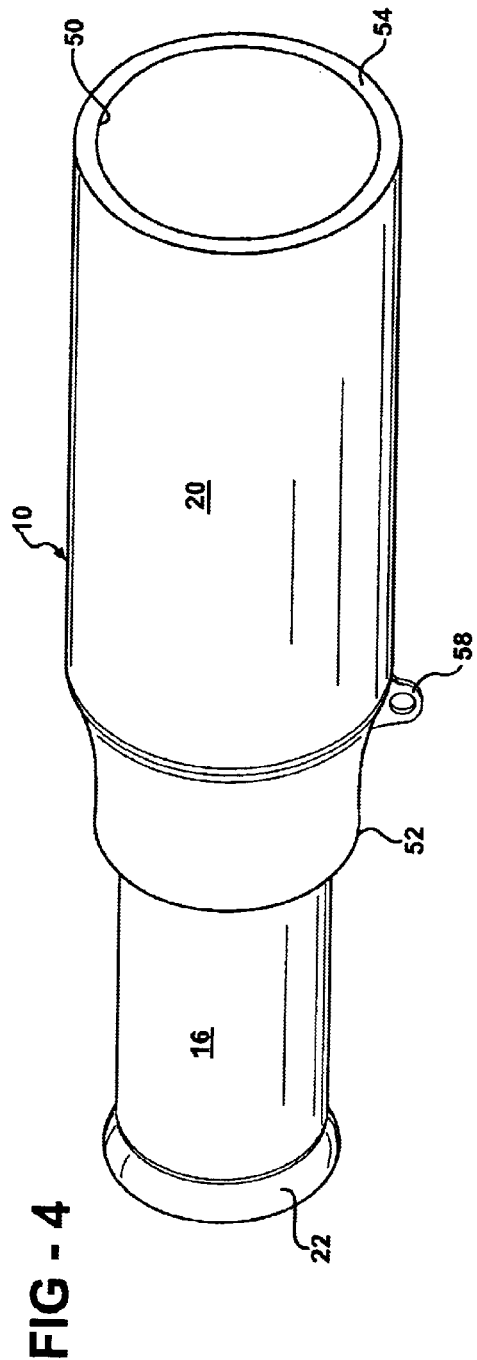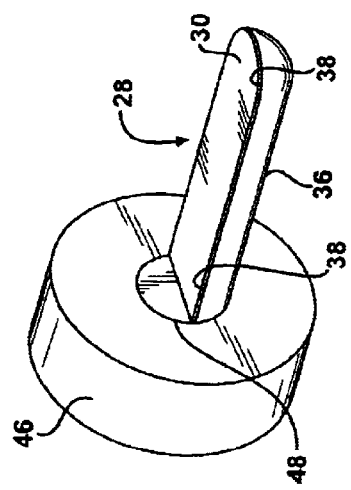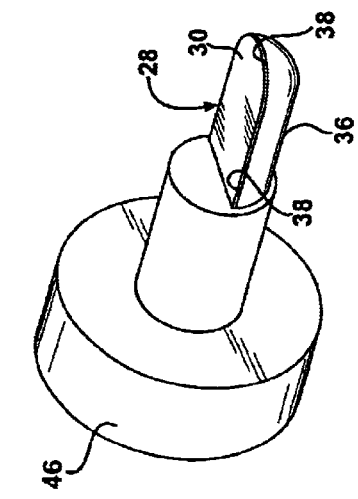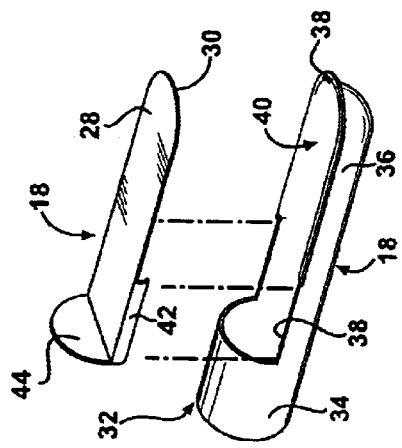

FREEZE-PROOF GAME CALL APPARATUS FOR CALLING PREDATORY GAME ANIMALS THROUGH INHALING

TECHNICAL FIELD

The subject invention generally relates to a game call apparatus. More specifically, the subject invention relates to a game call apparatus that is used to call predatory game animals through inhaling such that the game call apparatus is freeze-proof.

BACKGROUND OF THE INVENTION

Many different types of game calls are known in the art. Examples of several types of conventional game calls are disclosed in U.S. Pat. Nos. 4,050,186; 4,612,001; 4,888,903; and 4,915,660. The game calls of the prior art are deficient for a variety of reasons. For example, the game call disclosed in the '186 patent to Shults et al. is deficient because it includes an open reed design having an exposed reed that is particularly susceptible to damage during use. Furthermore, the reed in the game call of the '186 patent is oriented to produce a tone upon blowing, i.e., exhaling, by a user, as opposed to by inhaling. As such, moisture from the breath of the user collects on the reed which freezes upon exposure to freezing or below-freezing temperatures thereby rendering this game call non-functional under such conditions.

The game call disclosed in the '001 patent to Burnham is deficient for the same reason. That is, this game call is particularly susceptible to freezing due to the orientation of the reed and the requirement to exhale to produce a tone. The game call disclosed in the '903 patent to Knight et al. is deficient because it is functional upon blowing by the user. As such, it is also susceptible to freezing as described above. Furthermore, the game call disclosed in the '903 patent is unnecessarily complex because it requires an additional component, specifically the stopper 32, to secure the reed to the base such that the reed can vibrate. This particular reed is also not suitable for production of tones that call predatory game. The game call disclosed in the '660 patent to Overholt, Sr. is deficient because it is also susceptible to freezing due to the orientation of the reed and the requirement to exhale to produce a tone.

Yet another game call of the prior art is disclosed in U.S. Pat. No. 6,514,116. The particular game call disclosed in the '116 patent to Abbas is deficient for a variety of reasons. First, this game call is designed to call deer, as opposed to predatory game animals. As a result, the game call of the '116 patent requires a certain type of reed that utilizes grooves and O-rings. Such a reed is cumbersome. Furthermore, the game call disclosed in the '116 patent relies on a flexible conduit for fluid communication between a mouth of the user and the game call itself. That is, the mouthpiece is not adapted to be directly inserted into the mouth of the user.

Finally, due to the increased use of calls in the hunting of predatory game animals, certain predators have become accustomed to the tones produced by the game calls of the prior art. More specifically, these game calls do not utilize reeds that produce a tone that is optimized to attract predatory game animals.

Due to the various deficiencies associated with the game calls of the prior art, including those described above, it is desirable to provide a game call that is used to call predatory game animals through inhaling such that the game call is freeze-proof and, therefore, functional under freezing conditions.

SUMMARY OF THE INVENTION

A freeze-proof, game call apparatus is disclosed. A user uses the game call apparatus to call predatory game animals through inhaling. The game call apparatus includes a mouthpiece member, a reed assembly, and an amplification member. More specifically, the mouthpiece member has a first end and a second end. The first end defines an aperture for fluidly communicating with a mouth of the user such that the user can inhale therethrough. The reed assembly is disposed within the mouthpiece member at the second end. The reed assembly includes a reed having a working end opposite the aperture of the mouthpiece member. As air is drawn across the working end, the working end vibrates to produce a tone. This tone is produced as air is drawn across the working end due to inhalation by the user through the aperture. The reed assembly utilized in the game call apparatus of the subject invention is suitable for calling predatory game animals and is free of grooves and O-rings that modify the tone produced by the reed assembly. The amplification member is operatively connected to the mouthpiece member to completely enclose the working end of the reed. The amplification member amplifies the tone produce by the reed assembly.

Accordingly, the subject invention provides a game call apparatus for calling predatory game animals that is freeze-proof and that produces a tone that is optimized to attract the predatory game animals due to inhalation by the user.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is an exploded, partially cross-sectional side view of the game call apparatus;

FIG. 3 is an assembled, partially cross-sectional side view of the game call apparatus of FIG. 2;

FIG. 4 is a perspective view of the game call apparatus of FIGS. 2 and 3;

FIG. 5 is a perspective view illustrating a reed assembly of the game call apparatus including a first type of reed, a support member, and an annular sleeve;

FIG. 6 is a perspective view illustrating a reed assembly of the game call apparatus including a second type of reed, a support member, and an annular sleeve; and FIG. 7 is an exploded perspective view illustrating a reed assembly of the game call apparatus.

DESCRIPTION OF THE PREFERRED EMBODIMENT

Figure 1:
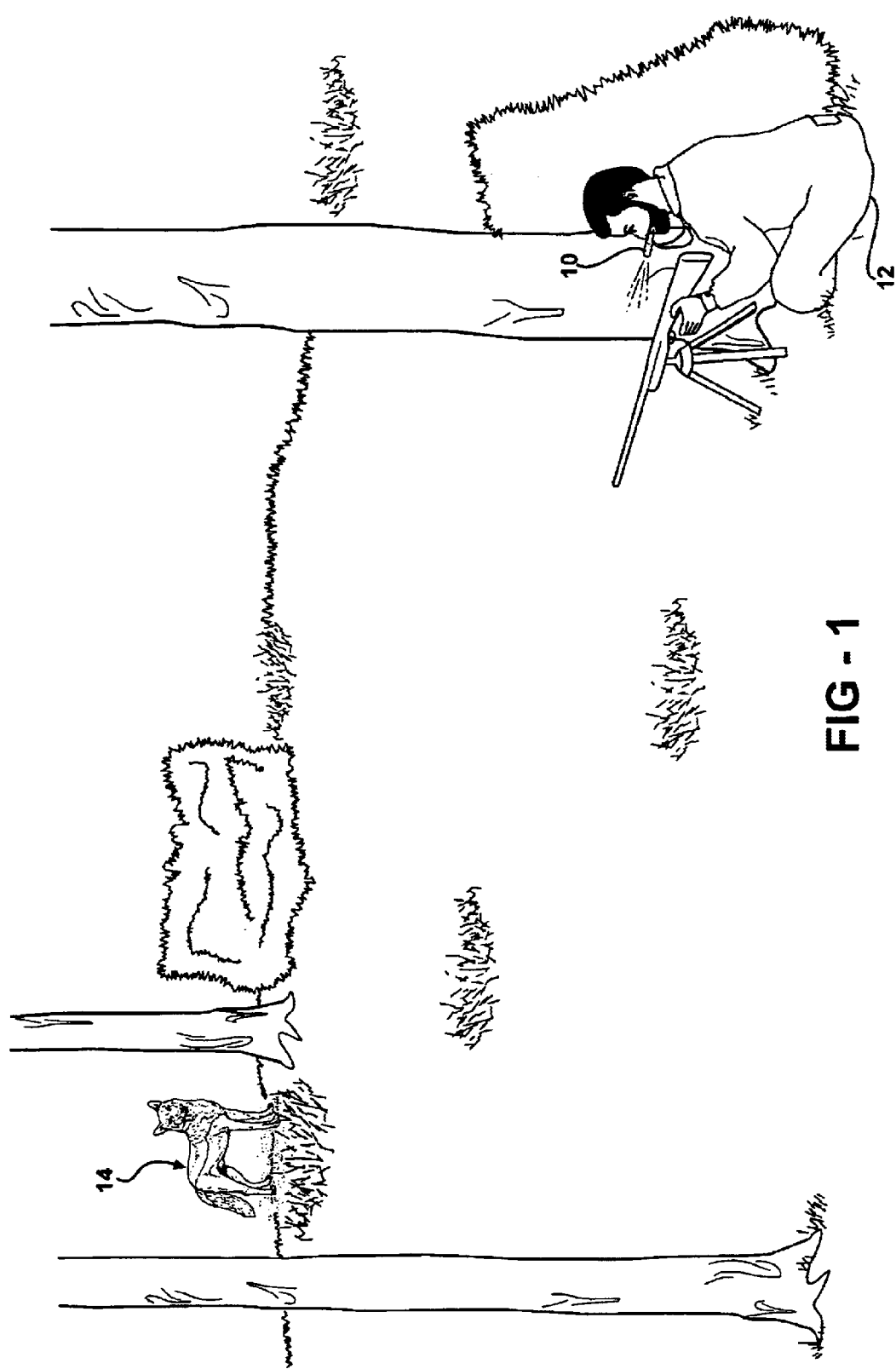
FIG. 1 is an environmental perspective view of a user utilizing a game call apparatus according to the subject invention to call a predatory game animal.

Referring to the Figures, wherein like numerals indicate like or corresponding parts throughout the several views, a freeze-proof, game call apparatus is generally disclosed at 10. For descriptive purposes only, the game call apparatus 10 of the subject invention is hereinafter referred to as the game call 10. The game call 10 is utilized by a user 12 to call predatory game animals 14 through inhaling. Predatory game animals 14 that can be called by the game call 10 of the subject invention include, but are not limited to, coyote, bobcats, foxes, mountain lion, wolves, and javelins.

The game call 10 includes a mouthpiece member 16, a reed assembly 18, and an amplification member 20. Referring particularly to FIGS. 2 through 4, the mouthpiece member 16 has a first end 22 and a second end 24. The first end 22 defines an aperture 26 for fluidly communicating with a mouth of the user 12 such that the user 12 can inhale therethrough. More specifically, the mouthpiece member 16 is adapted to be directly inserted into the mouth of the user 12. For example, as illustrated best in FIG. 4, the mouthpiece member 16 is contoured to suitably fit with lips of the user 12.

The reed assembly 18 is disposed within the mouthpiece member 16 at the second end 24. The reed assembly 18 includes a reed 28 that has a working end 30 opposite the aperture 26 of the mouthpiece member 16. Because the reed 28 is oriented in this manner, specifically with the working end 30 opposite the aperture 26 of the mouthpiece member 16, the working end 30 functions upon inhaling by the user 12, i.e., when the user 12 sucks through the mouthpiece member 16. As a result, moisture from the breath of the user 12 does not collect on the reed 28. Because there is no moisture on the reed 28, there is nothing on the reed 28 to freeze when the game call 10 is used in freezing or below-freezing temperatures and this game call 10 remains functional under such conditions.

Preferably, the reed 28 is a stainless steel reed. However, in alternative embodiments other types of reeds 28 include, but are not limited to, brass reeds, mylar reeds, and the like. Furthermore, it is preferred that the reed 28 has a thickness ranging from 0.002 to 0.07 inches. With a thickness at, or within, this range, a tone that is most optimized for calling predatory game animals through inhaling can be produce.

The reed 28 vibrates as air is drawn across the working end 30. Air is drawn across the working end 30 to produce the tone upon inhalation by the user 12 through the aperture 26. The tone produced by the working end 30 of the reed 28 is produced as a result of a frequency of the vibration of the reed 28. The reed assembly 18 utilized in the game call 10 of the subject invention is particularly suitable for calling predatory game animals 14, as opposed to deer. More specifically, the frequencies produced by the various types of reeds 28 that are suitable for use in the game call 10 of the present invention are frequencies that are recognized by the predatory game animals 14 that this game call 10 targets. As a result, it is ideal that the reed assembly 18 utilized in the subject invention is free of grooves and O-rings that modify the tone produced by the reed assembly 18.

Referring primarily to FIG. 7, the reed assembly 18 includes a support member 32 that is hollow and that includes an end 34 and an extension 36. More specifically, the end 34 defines a hollow portion. The extension 36 extends from the end 34 and terminates in a peripheral lip 38 for supporting the reed 28. The reed 28 is disposed on the extension 36 of the support member 32 thereby establishing a cavity 40 between the reed 28, the peripheral lip 38, and the extension 36. The cavity 40 enables the air to be drawn across the working end 30 of the reed 28. As disclosed in FIG. 7, it is preferred that an edge 42 of the reed 28 is crimped, or otherwise folded, about the peripheral lip 38 to secure the reed 28 to the support member 32. Crimping the reed 28 about the peripheral lip 38 simplifies the total number of components necessary to secure the reed 28 to the support member 32. In other words, a separate component is not required to secure the reed 28 to the support member 32 because the reed 28 secures itself. Furthermore, as disclosed best in FIGS. 2, 3, and 7, one side 44 of the reed 28 is L-shaped. This L-shape blocks off the hollow portion of the end 34 of the support member 32 to ensure that the air is drawn across the working end 30 of the reed 28.

Referring particularly to FIGS. 5 and 6, the reed assembly 18 further comprises an annular sleeve 46 that defines a hole 48. The end 34 of the support member 32 is disposed in the hole 48 to align the reed 28 with the aperture 26 of the mouthpiece member 16. This maximizes an effectiveness of the reed 28. The annular sleeve 46 has an outer diameter and the mouthpiece member 16 has an inner diameter. The outer diameter of the annular sleeve 46 mates with the inner diameter of the mouthpiece member 16. As a result of this relationship, the reed assembly 18 can be press fit into the mouthpiece member 16. As a result of the annular sleeve 46, the reed assembly 18 fits snugly within the mouthpiece member 16.

The amplification member 20 is operatively connected to the mouthpiece member 16 to completely enclose the working end 30 of the reed 28. Enclosing the working end 30 of the reed 28 protects the reed 28 from damage that may occur during hunting. Enclosing the working end 30 of the reed 28 also amplifies the tone produced by the reed assembly 18, which is desirable when attempting to call predatory game animals 14 from a distance. The amplification member 20 defines an amplification chamber 50 and the working end 30 of the reed extends at least partially into the amplification chamber 50.

To assemble the game call 10, after the support member 32 is disposed in the hole 48 of the annular sleeve 46, and after the reed assembly 18, specifically the annular sleeve 46, is press fit into the mouthpiece member 16, the second end 24 of the mouthpiece member 16 is disposed within the amplification member 20, specifically within the amplification chamber 50 defined by the amplification member 20. More specifically, the amplification member 20 includes a proximal end 52 and a distal end 54, and the second end 24 of the mouthpiece member 16 is disposed in the proximal end 52 of the amplification member 20 such that the proximal end 52 engages the second end 24.

As disclosed in FIGS. 2 and 3, the amplification member 20 includes at least one nipple 56 circumferentially disposed about an internal wall, disclosed but not numbered in the Figures, of the amplification member 20. Although not required, it is preferred that a plurality of nipples 56 are disposed about the internal wall of the amplification member 20. Upon disposition of the second end 24 of the mouthpiece member 16 into the proximal end 52 of the amplification member 20, the second end 24 abuts the nipple 56 so the assembler can realize just how far to force the mouthpiece member 16 into the amplification member 20. The nipple 56 or nipples 56 are disposed on the internal wall at a point that enables the mouthpiece member 16 to be inserted into the amplification chamber 50 just enough so that the mouthpiece member 16 fits snugly with the internal wall of the amplification member 20.

Referring particularly to FIGS. 2 through 4, the amplification member 20 includes a circumference and this circumference increases from the proximal end 52 to the distal end 54, which tends to enhance the amplification provided by the amplification member 20. Still referring to FIGS. 2 through 4, the game call 10 of the subject invention preferably includes an eyelet 58 that extends from one of the mouthpiece member 16 and the amplification member 20. The eyelet 58 receives a lanyard, not shown in the Figures, that is used to secure the game call 10 about a neck of the user 12 when the game call 10 is not being used to call the predatory game animal 14. In the most preferred embodiment, the eyelet extends 58 from the amplification member 20, but it is to be appreciated that the eyelet 58 can extend from the mouthpiece member 16 instead of the amplification member 20 so long as the eyelet 58 does not interfere with the insertion of the mouthpiece member 16 into the amplification member 20.

The invention has been described in an illustrative manner, and it is to be understood that the terminology that has been used is intended to be in the nature of words of description rather than of limitation. Obviously, many modifications and variations of the present invention are possible in light of the above teachings. Therefore, it is to be understood that within the scope of the appended claims, the invention may be practiced otherwise than as specifically described.

What is claimed is:

1. A freeze-proof, game call apparatus for a user to call predatory game animals through inhaling, said apparatus comprising:

a mouthpiece member having a first end and a second end with said first end defining an aperture for fluidly communicating with a mouth of the user such that the user can inhale therethrough;

a reed assembly disposed within said mouthpiece member at said second end, said reed assembly comprising a reed having a working end opposite said aperture of said mouthpiece member that vibrates as air is drawn across said working end to produce a tone upon inhalation by the user through said aperture, wherein said reed assembly is free of grooves and O-rings that modify the tone produced by the reed assembly; and an amplification member operatively connected to said mouthpiece member to completely enclose said working end of said reed for amplifying the tone produce by the reed assembly.

2. A freeze-proof, game call apparatus as set forth in claim 1 wherein said amplification member defines an amplification chamber and said working end of said reed extends at least partially into said amplification chamber.

3. A freeze-proof, game call apparatus as set forth in claim 1 wherein said reed assembly further comprises a support member that is hollow and that includes an end and an extension extending from said end that terminates in a peripheral lip for supporting said reed.

4. A freeze-proof, game call apparatus as set forth in claim 3 wherein said reed is disposed on said extension of said support member thereby establishing a cavity between said reed, said peripheral lip, and said extension that enables the air to be drawn across said working end of said reed.

5. A freeze-proof, game call apparatus as set forth in claim 4 wherein an edge of said reed is crimped about said peripheral lip to secure said reed to said support member.

6. A freeze-proof, game call apparatus as set forth in claim 3 wherein said reed assembly further comprises an annular sleeve defining a hole and said end of said support member is disposed in said hole to align said reed with said aperture of said mouthpiece member for maximizing an effectiveness of said reed.

7. A freeze-proof, game call apparatus as set forth in claim 4 wherein said annular sleeve has an outer diameter and said mouthpiece member has an inner diameter with said outer diameter of said annular sleeve mating with said inner diameter of said mouthpiece member such that said reed assembly can be press fit into said mouthpiece member.

8. A freeze-proof, game call apparatus as set forth in claim 1 wherein said reed is further defined as a brass reed.

9. A freeze-proof, game call apparatus as set forth in claim 1 wherein said reed is further defined as a stainless steel reed.

10. A freeze-proof, game call apparatus as set forth in claim 1 wherein said reed is further defined as a mylar reed.

11. A freeze-proof, game call apparatus as set forth in claim 1 wherein said mouthpiece member is adapted to be directly inserted into the mouth of the user.

12. A freeze-proof, game call apparatus as set forth in claim 1 wherein said second end of said mouthpiece member is disposed within said amplification member.

13. A freeze-proof, game call apparatus as set forth in claim 12 wherein said amplification member comprises at least one nipple circumferentially disposed about an internal wall of said amplification member for abutting said second end of said mouthpiece member upon disposition of said second end of said mouthpiece member into said amplification member.

14. A freeze-proof, game call apparatus as set forth in claim 1 wherein said amplification member comprises a proximal end and a distal end, said proximal end engaging said second end of said mouthpiece member, wherein a circumference of said amplification member increases from said proximal end to said distal end.

15. A freeze-proof, game call apparatus as set forth in claim 1 further comprising an eyelet extending from one of said mouthpiece member and said amplification member for receiving a lanyard used to secure said freeze-proof, game call apparatus about a neck of the user.

16. A freeze-proof, game call apparatus as set forth in claim 1 wherein said reed has a thickness ranging from 0.002 to 0.07 inches.

\* \* \* \* \*